UNITED STATES PATENT OFFICE.

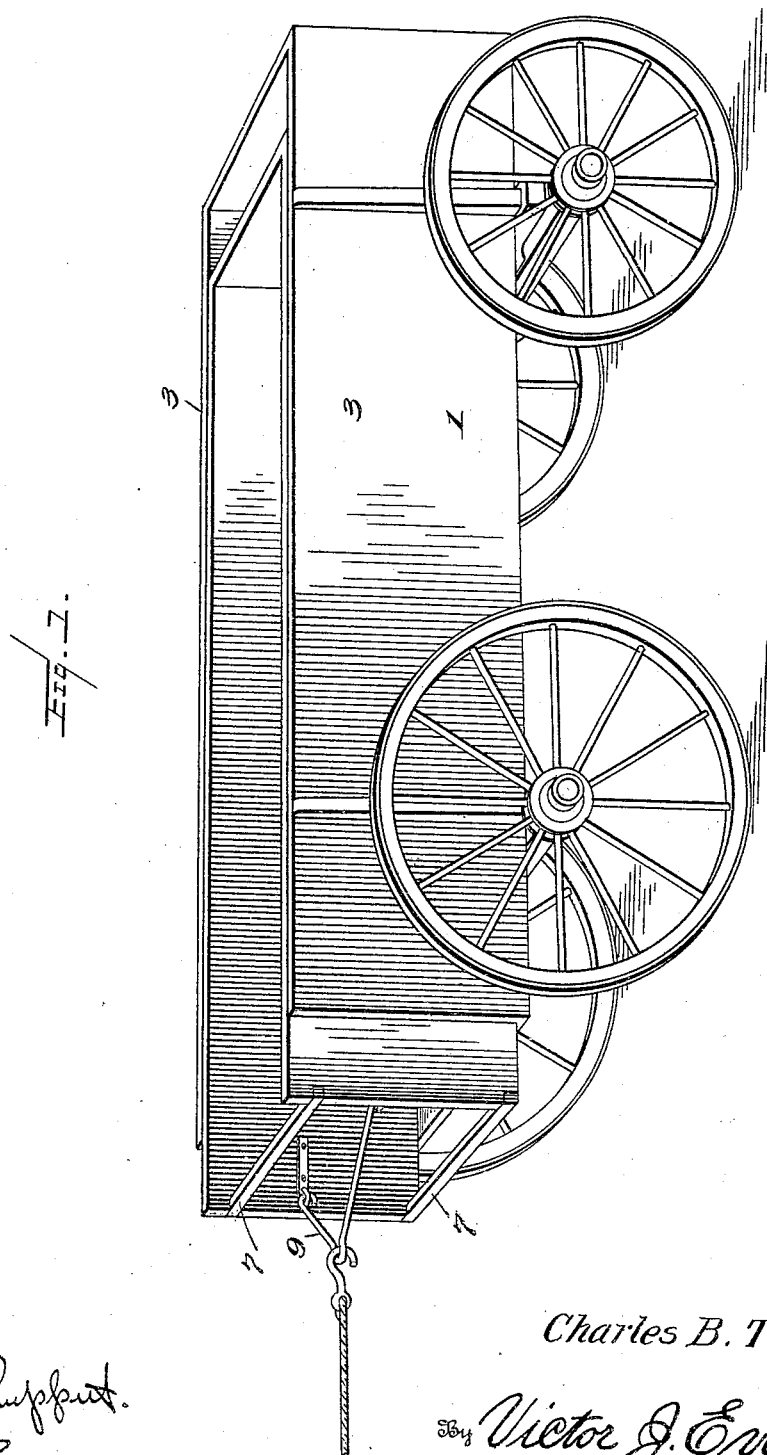

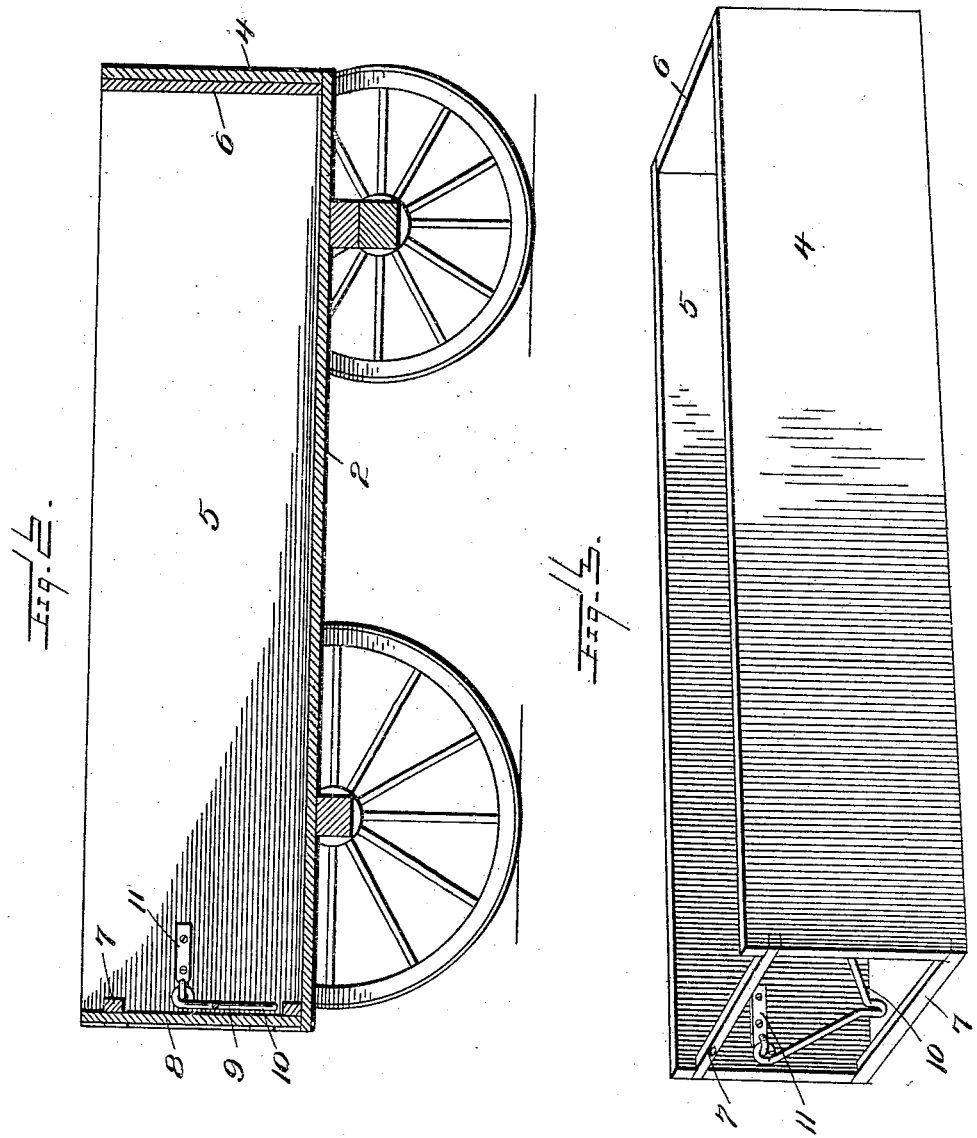

CHARLES BOONE TILLERY, OF LONDON, KENTUCKY.

WAGON-BED.

939,758. Specification of Letters Patent. Patented Nov. 9, 1909.

Application filed February 19, 1909. Serial No. 478,775.

*To all whom it may concern:*

Be it known that I, CHARLES BOONE TILLERY, a citizen of the United States, residing at London, in the county of Laurel and State of Kentucky, have invented new and useful Improvements in Wagon-Beds, of which the following is a specification.

This invention relates to improvements in wagon beds or boxes particularly with reference to improved means for unloading a wagon bed or box and the said invention consists in the construction, combination and arrangement of devices hereinafter described and claimed.

In the accompanying drawings:—Figure 1 is a perspective view of a wagon provided with a bed or box constructed in accordance with this invention, the unloading frame being shown partly withdrawn from the bed or box. Fig. 2 is a vertical longitudinal central sectional view of the same with the unloading frame disposed entirely within the bed or box. Fig. 3 is a perspective view of the unloading frame.

The bed or box 1 of the wagon here shown is of the usual construction comprising the bottom 2, the side boards 3 and the front end board 4. The rear end of said bed or box is open.

In accordance with my invention, I provide an unloading frame which comprises side boards 5, a front end board 6 which connects said side boards together and a pair of cross bars 7 which connect the rear ends of said side boards together, one of said cross bars being at the lower side of said frame and the other being near the upper side thereof. The said frame is open at both the top and at the bottom and the width of the said frame is such that it is adapted to fit snugly between the side boards of the wagon bed and its length is practically coextensive with that of the wagon bed so that the said frame is adapted to be disposed entirely within the wagon bed. An end gate 8 is provided for the rear end of the wagon bed to close the latter and to also close the rear end of the unloading frame when said unloading frame is disposed within the wagon bed. A clevis 9 which may be of any suitable construction is provided for the rear end of the unloading frame.

In the operation of my invention, the unloading frame, prior to the loading of the wagon, is disposed entirely within the wagon bed as shown in Fig. 2 and the wagon is then loaded so that the load lies on the bottom of the wagon bed and between the sides of the bottomless unloading frame. When it is desired to unload the wagon, the end gate 8 is first removed and the unloading frame is drawn out from the wagon which may be accomplished by drawing the unloading frame from the wagon or by attaching the unloading frame to some fixed object by means of a rope and hook engaged with the clevis and then causing the team to draw the wagon forwardly so as to move the wagon bed from under the unloading frame and it will be understood that the load will be dropped from the unloading frame on to the ground as the unloading frame becomes withdrawn from the wagon body.

This invention is particularly useful for unloading building material such as sand, gravel, broken stone and the like and is also extremely useful for unloading other material which requires to be dumped.

The clevis 9 comprises a bail 10 and a pair of irons 11 to which the ends of the bails are pivotally connected, the said irons being secured to the inner sides of the side boards 5 of the unloading frame at such a distance from the rear end of the unloading frame as to enable the bail when the same is in a vertical position to lie entirely within and clear of the end gate 8.

What is claimed is:—

1. A wagon having a wagon box provided with a bottom, sides, a front end board and a removable rear end gate, in combination with an unloading frame in said box, said unloading frame comprising side boards nearly coextensive in length with and disposed on the inner sides of the sides of the box and a front end board connecting such side boards together, said box being open at its rear end, and a clevis at one end of said unloading frame to facilitate withdrawal thereof through the rear of the box.

2. A wagon having a wagon box provided with a bottom, sides, a front end board and a removable rear end gate, in combination with an unloading frame in said box, said unloading frame comprising side boards nearly coextensive in length with and disposed on the inner sides of the sides of the box and a front end board connecting such side boards together, said box being open at its rear end, and a clevis at one end of said unloading frame to facilitate withdrawal thereof through the rear of the box, said clevis being pivotally connected to the unloading frame and adapted by gravity to assume a vertical position within the rear end of said unloading frame.

In testimony whereof I affix my signature in presence of two witnesses.

CHARLES BOONE TILLERY.

Witnesses:
E. K. SUTTON,
LULU V. JONES.